Aug. 19, 1969     C. D. DOCKERY     3,461,503
MOLDING
Filed April 28, 1967                     2 Sheets-Sheet 1
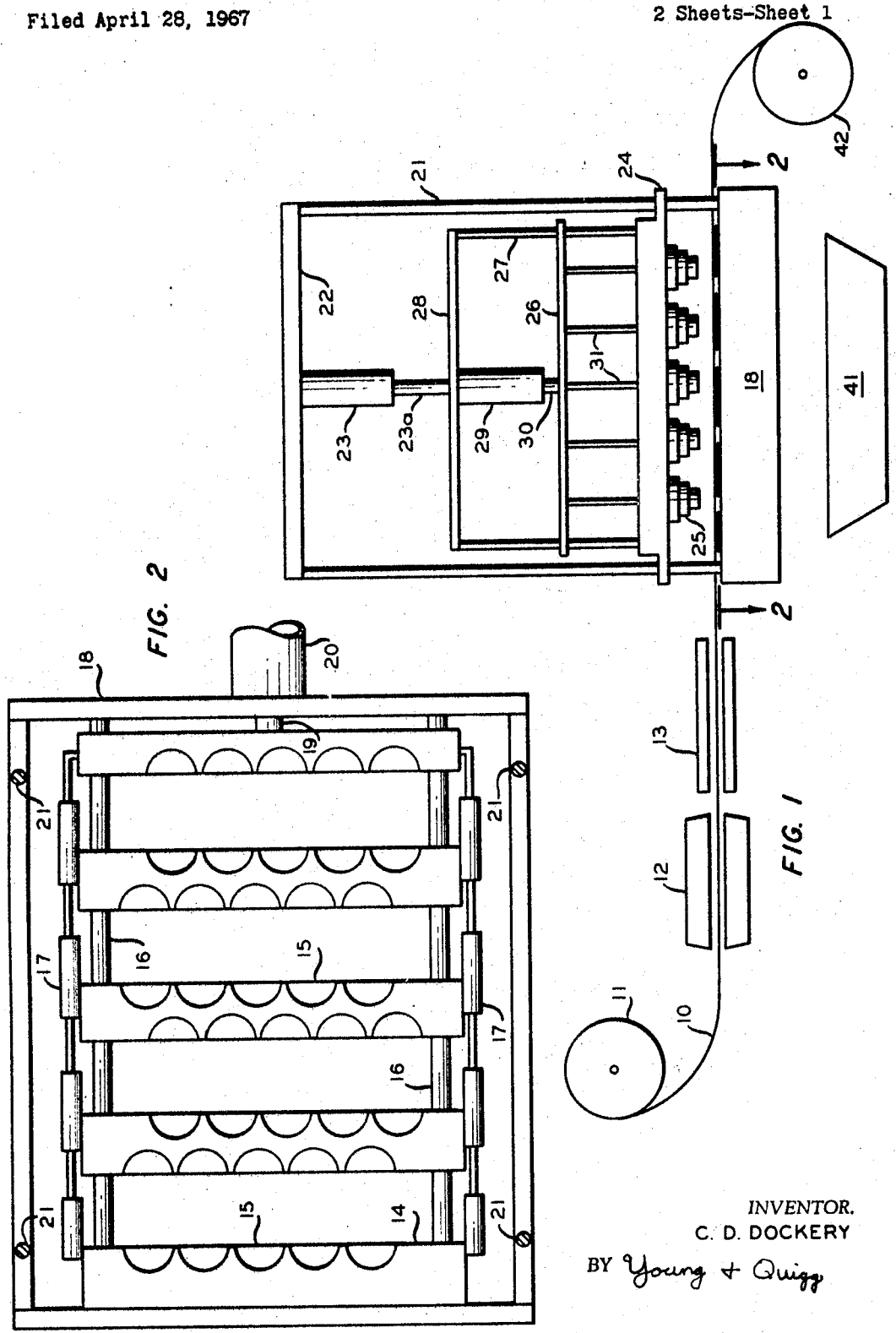
INVENTOR.
C. D. DOCKERY
BY Young + Quigg
ATTORNEYS Aug. 19, 1969  C. D. DOCKERY  3,461,503
MOLDING
Filed April 28, 1967  2 Sheets-Sheet 2

INVENTOR.
C. D. DOCKERY
BY Young + Quigg

ATTORNEYS

UnitedStates Patent Office 3,461,503
Patented Aug. 19, 1969

3,461,503
MOLDING
Calvin D. Dockery, Bartlesville, Okla., assignor to Phillips Petroleum Company, a corporation of Delaware
Filed Apr. 28, 1967, Ser. No. 634,721
Int. Cl. B29c 17/00
U.S. Cl. 18—19                7 Claims

ABSTRACT OF THE DISCLOSURE

An apparatus for forming containers is provided having a mandrel for depressing heated thermoplastic sheet material into the upper neck portion of a mold to, for example, form external threads thereon. A raised shoulder is provided around the lower portion of the neck in the mold cavity and cooperates with the inserted mandrel to thereby retard thermoplastic material flow from the formed neck as the body of the container is formed.

---

This invention relates to molding. In another aspect, this invention relates to a novel molding apparatus for producing containers from thermoplastic sheet material.

It is known that containers of uniform wall thickness can be formed from thermoplastic sheet material in molding operations. For example, one method is to first draw the warmed sheet material to a similar size and shape as the finished container and then to expand the draw-out sheet by differential pressure to the size and shape of the finished article in a mold chamber. Recently, it has been discovered that if the initial drawing or stretching operation is carried out with the material maintained at its crystal orientation temperature, such operation will result in the axial orientation of the crystals. The subsequent forming of the container will result in a biaxially-oriented container.

In this regard, it is known that the greatest orientation of the plastic is obtained when the parison is expanded while in the crystalline state at a temperature between the crystalline melting point and the crystalline freezing point. Generally, these orientation temperatures will be in the range of from 2–40° F. below the crystalline melt point of the polymers. The crystalline freezing point is the temperature at which maximum crystalline formation occurs upon cooling of the molten polymer, and the crystalline melt point is the temperature at which evidence of crystallinity disappears upon heating a sample of polymer from a crystallined condition. Ordinarily, the latter temperature is several degrees above the crystalline freezing point. For maximum orientation, it is desirable to cool the material below the crystalline freezing point and then reheat it to the proper orienting temperature. For polypropylene this orientation temperature will lie in the range between 300–338° F. For linear polyethylene the range will be between 237–271° F.

Thus, relatively thin-walled oriented thermoplastic containers can be produced from the above process. However, a disadvantage heretofore present when producing containers, particularly wide-mouth containers, from the above methods is the inadequate formation of the mouth or neck portion of each container. Due to the uniform stretching of the heated thermoplastic sheet during the initial forming or stretching operation and the subsequent forming operation, it was heretofore difficult, if not impossible, to form containers having relatively thick wall sections in the neck portion and/or containers carrying external lugs or threads on these neck portions. However, in many operations it is desired that these containers carry external threads or lugs on the neck to receive a detachable lid, or that the neck section be thicker and thereby stronger than the container body to thereby receive a slidable and removable top. Therefore, it is desirable that the wall section of the necks of thermoplastic containers generally be thicker and thereby more rigid than the corresponding wall section of the body of the container.

Accordingly, one object of this invention is to design an improved apparatus for producing containers from heated thermoplastic sheet material.

Another object of this invention is to provide an improved apparatus for producing containers having threaded neck sections from heated thermoplastic sheet material.

According to this invention an improved apparatus for molding containers from heated thermoplastic sheet material is provided comprising a mold chamber having an internal configuration of the container to be formed including a body section and a neck section, and an opening communicating with the neck section. An inwardly protruding or raised shoulder is positioned around the lower portion of the neck, and a mandrel means is movably positioned to extend within the opening. The mandrel means is contoured and has at least two concentric zones so that when extended a primary annular opening is formed between the raised shoulder and a first zone, and at least one secondary annular opening exists between the neck section and the first and/or an intermediate zone or zones, the widest secondary annular opening being wider than said primary annular opening, and a last zone which is slightly smaller than said opening extends therein. The apparatus also has means to expand thermoplastic material from a leading portion of the mandrel. Thus, when a sheet of thermoplastic material is placed across the opening and the mandrel is moved down into the opening, the said last zone and the opening will cooperate to shear the material, portions of the material will be forced between the neck portion and the first and/or intermediate zone or zones, and the leading end of the mandrel will be covered with the deformed sheet material. The cooperating action of the first and/or intermediate zone or zones and the neck portion of the mold can form a smooth neck having a round, square, oval, rectangular, etc. configuration, or if thread or lug impressions are contained on the neck portion of the mold, a corresponding molded section of thermoplastic material will be formed. As the body portion of the container is formed by expanding the deformed material from the end of the mandrel, the cooperating action between the raised shoulder portion in the mold and the first zone of the mandrel will prevent excess material flow from the formed neck portion. This results in the side walls of the neck portion having a greater thickness than the side walls of the container body (and/or the desired configuration) after the expansion.

In a preferred embodiment of this invention, the leading end of the mandrel is extendable to a point adjacent the bottom of the mold cavity. Thus, when thermoplastic sheet material has been heated to its crystal orientation temperature, the mandrel is moved downward forming the neck portion, and then the leading end of the mandrel is extended to stretch the film downward and thereby orienting it. Lastly, the container body is formed by a differential pressure method. This results in a biaxially-oriented container body having a very strong neck portion of the configuration desired.

This invention can be more easily understood from a study of the drawings in which:

FIGURE 1 is a schematic illustration of a molding apparatus and process for producing multiple containers that can be used with this invention.

FIGURE 2 is a section taken along line 2—2 of FIGURE 1.

Figure 3:
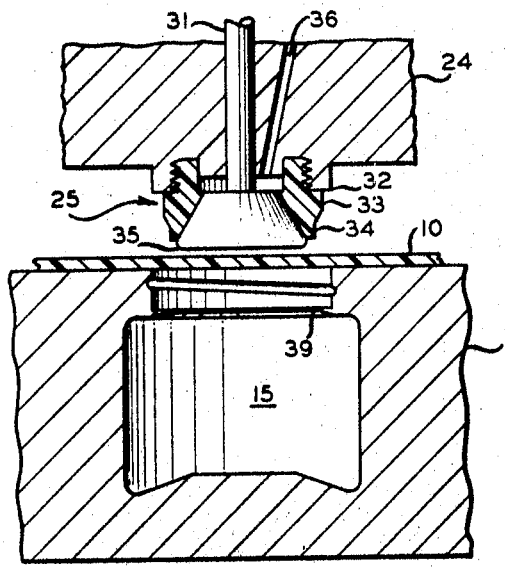
FIGURES 3 through 6 are sectional views of one mold cavity of the apparatus of FIGURE 1 illustrating this invention.

This invention will now be explained with reference to FIGURES 1-6. As will be noted below, FIGURE 1 illustrates a process of forming oriented threaded containers from thermoplastic sheet material. However, this invention can be used in producing non-oriented containers from a sheet of thermoplastic material such as, for example, a hot sheet of thermoplastic material supplied by a slot die from an extrude mechanism.

Now referring to FIGURE 1, a sheet of polypropylene, for example, which is from .125 to .300 inch thick is first passed from roll 11 to radiant heater 12 wherein the sheet is heated from about 70 to about 300° F. Sheet 10 is then passed from radiant heater 12 to uniform temperature block 13 wheren it is heated from about 300 to about 328° F., i.e., the orientation temperature of polypropylene. The above stated temperatures will vary if different thermoplastic sheet material is used. The sheet is then passed over split mold sections 14 within frame 18. Split mold sections 14 comprise a plurality of mold sections as illustrated in FIGURE 2. FIGURE 2 shows the mold sections in open positions. As illustrated, the mold sections cooperate to form twenty mold cavities, 15, in four rows of five each. Mold sections 14 rest in slidable contact on rails 16 and are held in the open position by shock absorbers 17 which can be either hydraulically actuated pistons or spring biased pistons. Rails 16 are connected to frame 18 as illustrated. Cylinder rod 19 is movably positioned through frame 18 and connects to a piston in hydraulic cylinder 20. As cylinder rod 19 is extended through frame 18, the mold halves 14 are thereby forced together to form a series of mold cavities 15. The configuration of mold cavities 15 is illustrated in FIGURES 3-6.

Referring again to FIGURE 1, upright guide members 21 are mounted on frame 18 and connect to plate 22 which carries hydraulic cylinder 23. Movable frame 24 carries mandrels 25 and is slidably mounted on upright members 21. Piston rod 23a connects to movable frame 24 through plate 28 and rods 27 and controls the vertical motion thereof. Movable frame 26 is slidably mounted on rods 27 extending from movable frame 24. Plate 28 carries hydraulic cylinder 29 which controls the vertical motion of piston rod 30. Piston rod 30 is connected to movable frame 26 which in turn connects to mandrel rods 31. It is noted that any actuating means known in the art can be utilized to actuate mandrel 25 and mandrel rods 31 and the embodiment illustrated in FIGURE 1 is given for illustrative purposes only.

Now again referring to FIGURES 1-6, the operation of this invention will be described. After the heated polypropylene sheet 10 is passed upon frame 18 and rests over mold sections 14 which are in the closed position, i.e., opposite to the position illustrated in FIGURE 2, the positions of each mandrel 25 over a respective mold cavity 15 is illustrated in FIGURE 3. Each mandrel 25 comprises cutting section 32, forming sections 33 and 34 and plunger 35 connected to mandrel rod 31. It may be desired to use several concentric forming sections or zones 33 of different diameters. Also, formed section 33 can be of the same diameter as forming section 34. The latter configuration will form a minimum of two concentric zones (32 and 34) on the mandrel. It is preferred that the insert carrying forming sections 33 and 34 and the plunger 35 be made of a highly inert plastic material such as Teflon to prevent any hot thermoplastic material from adhering thereto during the forming operation. As illustrated, blow pipe 36 extends through moving frame 24 and communicates with the open area behind plunger 35.

Figure 4:
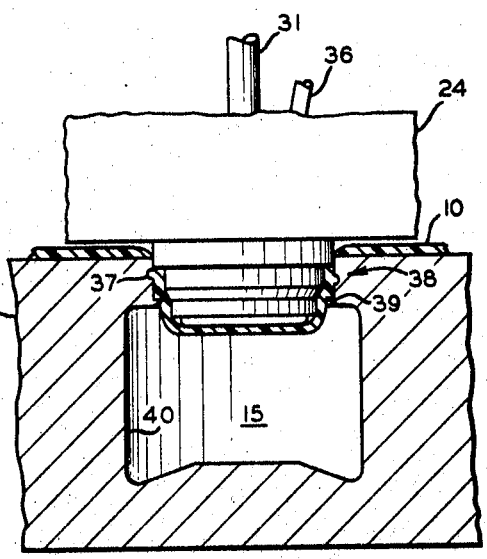

Next, hydraulic cylinder 23 is actuated to thereby force piston rod 23a downward. This, in turn, causes each mandrel 25 to force thermoplastic material through the opening of each mold cavity 15 as illustrated in FIGURE 4. As shown, the action of cutting section 32 cooperating with the opening to the mold cavity 15 shears the thermoplastic material from around the periphery of the mold opening. Forming sections 33 and 34 force the hot material into the spiral grooves 37 around the neck portion 38 of the internal mold cavity 15. Shoulders 39 extend outwardly from the lowermost portion of the neck adjacent to the body portion of the mold 40. As seen, the annular zone between the shoulder 39 and forming section 34 is narrower than the widest portion of the annular zone between forming sections 33 and 34 and neck section 38. It is preferred that the annular zone between shoulder 39 and forming section 34 be equal to or slightly larger than the thickness of the wall sections of the body portion of the container to be formed. As will be illustrated below, the action of shoulder 39 cooperating with forming section 34 will prevent excessive flow of thermoplastic material from the neck portion of the container as the body portion is subsequently formed.

Figure 5:
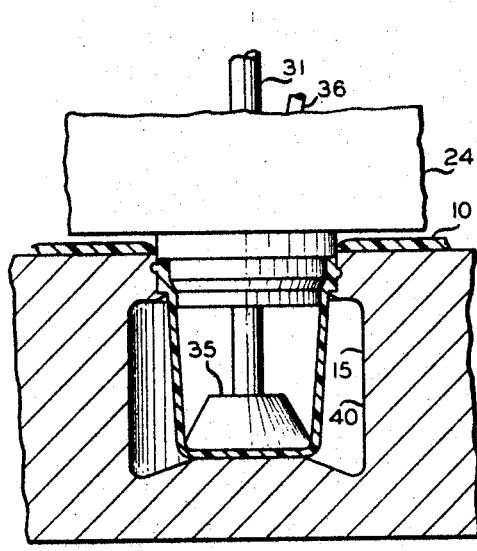

After the neck portion of the container has been formed as illustrated above, hydraulic cylinder 29 will be actuated to force piston rod 30 downward. This in turn will force moving frame 26 downward and depress mandrel rods 31. As illustrated in FIGURE 5, this latter action will cause plunger 35 to extend to a point adjacent to the bottom of mold cavity 15 thereby axially stretching the thermoplastic material enclosed there around. This stretching action will orient the crystals in the thermoplastic material as described above.

Figure 6:
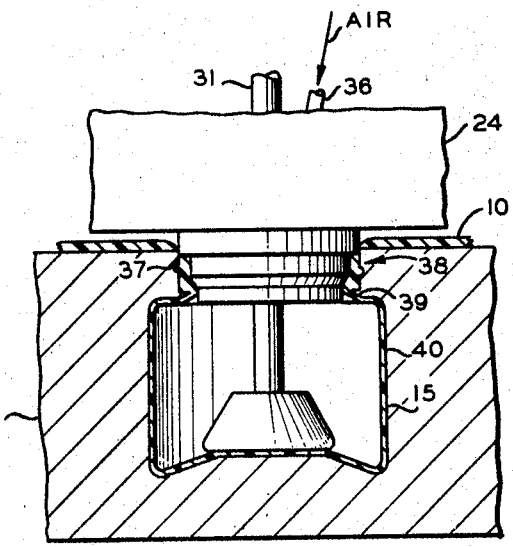

After plungers 35 have been depressed, a forming fluid such as air is forced through blow pipes 36 and the body portion of the container is formed as illustrated in FIGURE 6. It is noted, that during the stretching motion, as illustrated in FIGURE 5, and the body forming motion, as illustrated in FIGURE 6, the cooperation between the shoulder 39 and forming section 34 will prevent an excess of the material within the formed neck section of the container from flowing into body section 40 of the mold cavity. It must also be noted that the configuration of neck section 38, as illustrated in FIGURES 3-6, is in no way intended to limit the scope of this invention. For example, any type locking lug or screw thread design can be used instead of spiral groove 37. Also, if desired, a smooth walled neck can be provided by the apparatus of this invention. Also, any differential pressure forming process can be used. For example, a vacuum can be created within each mold cavity 15 to thereby expand each stretched thermoplastic portion against the mold wall utilizing atmospheric pressure.

After each container has been formed by differential pressure process, hydraulic cylinders 23 and 29 are actuated to move mandrels 25 and plungers 35 upward to the position as illustrated in FIGURE 1, and hydraulic cylinder 20 is actuated to thereby open mold sections 14 as illustrated in FIGURE 2. by ejection means such as an air blast or ejector pistons (not shown in FIGURE 2), the formed containers are ejected from the split mold sections 14 and fall into receiving bin 41 as illustrated in FIGURE 1. Any receiving means known in the art can be utilized to collect the ejected formed containers such as an endless belt, etc. The thermoplastic scrap material is then wound up on roller 42 as more heated material is passed over mold sections 14.

While the preferring embodiments of the present invention have been shown and described herein, it is obvious that many structural details may be changed without departing from the spirit and scope thereof.

I claim:

1. Apparatus for forming containers from a sheet of thermoplastic material comprising in combination:
    (a) a mold means having an opening communicating with an internal cavity, said cavity having a configuration of a container to be formed comprising a body portion, a neck portion connecting said body portion with said opening, and an inwardly protruding shoulder extending around the interior of said neck portion adjacent to said body portion;

(b) a mandrel means movably positioned to extend through said opening and contoured to have a first concentric forming section, at least one intermediate concentric forming section, and a concentric cutting section; said sections being so disposed that when said mandrel is so extended through said opening a first annular space exists between said first concentric forming section and said inwardly protruding shoulder, and at least one intermediate annular zone exists between said intermediate forming section and said neck portion, said at least one intermediate annular zone being wider than said first annular zone, said cutting section being slightly smaller than said opening so as to shear said thermoplastic sheet as said cutting section is extended into said opening;

(c) a plunger comprising the leading edge of said mandrel, said plunger being further extendible relative to said cutting and forming sections of said mandrel; and (d) means to extend said plunger to a point adjacent a bottom of said cavity so as to stretch portions of said thermoplastic sheet around said leading edge of said mandrel adjacent said first section.

2. Apparatus of claim 1 wherein said plunger is a piston head concentrically seated in the end of said mandrel, and said means to extend the said plunger comprises a piston rod attached to said piston head and movably positioned through said mandrel, said piston rod being attached to an actuation means.

3. Apparatus of claim 2 comprising in addition a fluid conduit through said mandrel with its outlet positioned adjacent said piston head, and a means for suplying forming fluid thereto connected to its inlet.

4. Apparatus of claim 3 wherein said first and intermediate sections and said piston head are made of a plastic material.

5. Apparatus of claim 4 wherein said opening and said neck portions are round and said mandrel is contoured to form 3 concentric cylindrically shaped sections comprising said first section and said cutting section and one intermediate section disposed therebetween having a larger diameter than said first section and a smaller diameter than said cutting section.

6. The apparatus of claim 5 wherein said neck portion of said mold carries screw thread indentations thereon.

7. Apparatus of claim 6 further comprising means to pass said heated thermoplastic sheet material over said opening.

References Cited

UNITED STATES PATENTS

| | | |
|---|---|---|
| Re. 23,171 | 11/1949 | Borkland. |
| 2,348,738 | 5/1944 | Hofmann. |
| 3,193,881 | 7/1965 | Kostur. |
| 3,259,942 | 7/1966 | Politis. |
| 3,303,249 | 2/1967 | Strauss. |
| 3,316,594 | 5/1967 | Hoffer et al. |

FOREIGN PATENTS

| | | |
|---|---|---|
| 1,095,632 | 12/1967 | Great Britain. |
| 648,521 | 11/1962 | Italy. |

WILLIAM J. STEPHENSON, Primary Examiner